United States Patent
Kayahara et al.

(10) Patent No.: US 10,428,695 B2
(45) Date of Patent: Oct. 1, 2019

(54) COMBINED CYCLE PLANT, DEVICE FOR CONTROLLING SAID PLANT, AND METHOD FOR STARTING UP SAID PLANT

(71) Applicant: MITSUBISHI HITACHI POWER SYSTEMS, LTD., Kanagawa (JP)

(72) Inventors: Masayuki Kayahara, Kanagawa (JP); Elvio Rubio, London (GB); Pablo Ratia, London (GB); Daniel Carlos Mora, London (GB)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/574,629

(22) PCT Filed: May 25, 2016

(86) PCT No.: PCT/JP2016/065510
§ 371 (c)(1),
(2) Date: Nov. 16, 2017

(87) PCT Pub. No.: WO2016/194742
PCT Pub. Date: Dec. 8, 2016

(65) Prior Publication Data
US 2018/0135468 A1    May 17, 2018

(30) Foreign Application Priority Data
May 29, 2015 (JP) .................. 2015-110628

(51) Int. Cl.
*F01K 23/10* (2006.01)
*F01D 19/00* (2006.01)
(Continued)

(52) U.S. Cl.
CPC .......... *F01K 23/101* (2013.01); *F01D 19/00* (2013.01); *F01K 7/165* (2013.01); *F01K 13/02* (2013.01);
(Continued)

(58) Field of Classification Search
CPC .......... F01D 19/00; F01D 25/00; F01K 23/10; F01K 13/00
See application file for complete search history.

(56) References Cited

U.S. PATENT DOCUMENTS 4,391,101 A * 7/1983 Labbe ................ B01D 19/0047
60/646
4,455,614 A * 6/1984 Martz ..................... F01K 23/10
290/40 R
(Continued)

FOREIGN PATENT DOCUMENTS

EP    2 792 856    10/2014
JP    58-197408    11/1983
(Continued)

OTHER PUBLICATIONS

English Translation JP 2002106305 A1 (Year: 2002).*
(Continued)

*Primary Examiner* — Mark A Laurenzi
*Assistant Examiner* — Shafiq Mian
(74) *Attorney, Agent, or Firm* — Wenderoth, Lind & Ponack, L.L.P.

(57) ABSTRACT

In a combined cycle plant, a device for controlling a combined cycle plant, and a method for starting up a combined cycle plant, the time for starting up the combined cycle plant can be shortened by providing: a gas turbine having a compressor, a combustor, and a turbine; a heat recovery steam generator for generating steam by means of the exhaust heat of exhaust gas from the gas turbine. A steam
(Continued)

turbine is driven by the steam generated by the heat recovery steam generator; and a control device is configured to set a standby load for the gas turbine during a start-up continuously to change in accordance with a change in metal temperature of the steam turbine.

16 Claims, 3 Drawing Sheets

(51) Int. Cl.
    *F01K 13/02* (2006.01)
    *F02C 7/26* (2006.01)
    *F01K 7/16* (2006.01)
    *F01K 23/16* (2006.01)
    *F01D 15/10* (2006.01)

(52) U.S. Cl.
    CPC .............. *F01K 23/10* (2013.01); *F01K 23/16* (2013.01); *F02C 7/26* (2013.01); *F01D 15/10* (2013.01); *F05D 2270/053* (2013.01); *Y02E 20/16* (2013.01)

(56) References Cited

U.S. PATENT DOCUMENTS

| | | | | |
|---|---|---|---|---|
| 10,041,680 | B2* | 8/2018 | Asai | F23R 3/002 |
| 2001/0022078 | A1* | 9/2001 | Horii | F02C 7/1435 |
| | | | | 60/39.182 |
| 2003/0046939 | A1* | 3/2003 | Hyakutake | F01D 21/12 |
| | | | | 60/782 |
| 2005/0074049 | A1* | 4/2005 | Tanaka | G01N 25/16 |
| | | | | 374/55 |
| 2007/0017227 | A1* | 1/2007 | Horiuchi | F02C 3/30 |
| | | | | 60/775 |
| 2012/0102950 | A1* | 5/2012 | Turchi | F01K 23/10 |
| | | | | 60/641.15 |
| 2014/0260284 | A1* | 9/2014 | Kim | F02C 7/057 |
| | | | | 60/772 |
| 2014/0290249 | A1* | 10/2014 | Yashiki | F01K 13/02 |
| | | | | 60/646 |

FOREIGN PATENT DOCUMENTS

| | | |
|---|---|---|
| JP | 3-70804 | 3/1991 |
| JP | 5-272361 | 10/1993 |
| JP | 8-260911 | 10/1996 |
| JP | 2002-106305 | 4/2002 |
| JP | 2005-106738 | 4/2005 |
| JP | 2010-121598 | 6/2010 |

OTHER PUBLICATIONS

Extended European Search Report dated Oct. 19, 2018 in European Patent Application No. 16803177.1.

International Search Report dated Jul. 19, 2016 in International (PCT) Application No. PCT/JP2016/065510.

Written Opinion of the International Searching Authority dated Jul. 19, 2016 in International (PCT) Application No. PCT/JP2016/065510.

Notification of Reasons for Refusal dated Jan. 29, 2019 in corresponding Japanese Patent Application No. 2015-110628 with machine translation.

* cited by examiner

COMBINED CYCLE PLANT, DEVICE FOR CONTROLLING SAID PLANT, AND METHOD FOR STARTING UP SAID PLANT

TECHNICAL FIELD

The present invention relates to a combined cycle plant including a gas turbine, a heat recovery steam generator, and a steam turbine; a device for controlling a combined cycle plant; and a method for starting up a combined cycle plant.

BACKGROUND ART

In combined cycle power generation, first of all, a gas turbine is driven using natural gas or the like as fuel, thereby carrying out the first power generation. Next, a heat recovery steam generator recovers exhaust gas of the gas turbine and generates steam. Then, a steam turbine is driven by means of the steam, thereby carrying out the second power generation. Combined cycle plants are power generation plants for executing the combined cycle power generation.

When a combined cycle plant is started up, a standby load for the gas turbine is set in accordance with a metal temperature of the steam turbine. For example, when the metal temperature of the steam turbine is equal to or lower than 200° C., a cold start-up is conducted. The standby load for the gas turbine is set to 10% and the gas turbine is started up. Meanwhile, when the metal temperature of the steam turbine is equal to or higher than 400° C., a hot start-up is conducted. The standby load for the gas turbine is set to 30% and the gas turbine is started up. In addition, when the metal temperature of the steam turbine is within a range from 200° C. to 400° C., the standby load for the gas turbine is set to 20% and the gas turbine is started up. Then, after the gas turbine is started up and a set standby load is retained thereon, when steam generated by means of exhaust gas reaches a predetermined temperature and predetermined pressure, the steam is supplied to the steam turbine, and the load on the gas turbine is increased. More specifically, when a mismatch between the steam temperature in an inlet of the steam turbine derived out from the temperature and the pressure of steam on an outlet side of the heat recovery steam generator, and the metal temperature of the steam turbine is reduced, and when a condition that the degree of superheat is sufficiently ensured is satisfied, steam starts to be supplied to the steam turbine.

Incidentally, there are demands for starting up a combined cycle plant at a standstill in an early stage and supplying electric power. Here, a gas turbine alone is capable of increasing the load at a relatively high load increasing rate. However, in a steam turbine, due to the restriction of thermal stress, the load is required to be increased at a load increasing rate lower than that in the gas turbine. That is, in the combined cycle plant, even though the load can be increased to a standby load for the gas turbine relatively quickly, the loads on both the gas turbine and the steam turbine are required to be increased at a low speed after steam starts to be supplied to the steam turbine. Accordingly, compared to a case of the gas turbine alone, it takes time to increase the load. Thus, the smaller the standby load for the gas turbine, the larger a load zone through which the loads on the gas turbine and the steam turbine are simultaneously increased. Therefore, the time for increasing the load on the entire combined plant is further lengthened.

Meanwhile, when the above-described combined cycle plants in the related art are started up, the standby load for the gas turbine with respect to a metal temperature range of the steam turbine is fixed for each start-up mode. Therefore, the standby load for the gas turbine changes at the border between the metal temperature ranges of the steam turbine. For example, when the metal temperature of the steam turbine is 195° C., a cold start-up is conducted, and the standby load for the gas turbine is set to 10%. When the metal temperature of the steam turbine is 205° C., a warm start-up is conducted, and the standby load for the gas turbine is set to 20%. In this case, although the difference between the metal temperatures of the steam turbine is 10° C., which is insignificant, when the metal temperature of the steam turbine is 195° C., the standby load for the gas turbine is set to 10%. Thus, a slight difference between the metal temperatures of the steam turbine makes the standby load for the gas turbine change significantly, thereby leading to a problem in that the time for starting up the combined cycle plant is lengthened.

In addition, when the above-described combined cycle plants in the related art are started up, an increasing load rate of the steam turbine during a start-up is fixed for each start-up mode. Therefore, the increasing load rate of the steam turbine changes at the border between the metal temperature ranges of the steam turbine. For example, when the metal temperature of the steam turbine is 195° C., a cold start-up is conducted, and the increasing load rate is set to be relatively low. When the metal temperature of the steam turbine is 205° C., a warm start-up is conducted, and the increasing load rate is set to be relatively high. In this case, although the difference between the metal temperatures of the steam turbine is 10° C., which is insignificant, when the metal temperature of the steam turbine is 195° C., the increasing load rate of the steam turbine is set to be on the low side. Thus, a slight difference between the metal temperatures of the steam turbine makes the increasing load rate of the steam turbine change significantly, thereby leading to a problem in that the time for starting up the combined cycle plant is lengthened and it requires time.

The present invention has been made in order to solve the above-described problems, and an object thereof is to provide a combined cycle plant, a device for controlling a combined cycle plant, and a method for starting up a combined cycle plant that can shorten a time for starting up the combined cycle plant.

SUMMARY OF THE INVENTION

In order to achieve the object, according to the present invention, there is provided a combined cycle plant including: a gas turbine that has a compressor, a combustor, and a turbine; a heat recovery steam generator that generates steam by means of exhaust heat of exhaust gas from the gas turbine; a steam turbine that is driven by means of steam generated by the heat recovery steam generator; and a control device configured to set a standby load for the gas turbine during a start-up continuously to change in accordance with a change in metal temperature of the steam turbine.

Accordingly, the standby load for the gas turbine during a start-up is set to an optimum value with respect to the metal temperature of the steam turbine, so that the gas turbine is operated under a proper load. Therefore, a load zone through which the loads on the gas turbine and the steam turbine are simultaneously increased can be reduced as much as possible, and the time for starting up the entire combined cycle plant can be shortened.

In the combined cycle plant of the present invention, the standby load is a function of the metal temperature and increases in accordance with a rise of the metal temperature.

Accordingly, since the standby load is a function increasing in accordance with a rise of the metal temperature, when the temperature of the steam turbine rises, the standby load for the gas turbine increases. Therefore, it is possible to start up the gas turbine under a proper load and to reduce the load zone through which the loads on the gas turbine and the steam turbine are simultaneously increased.

In the combined cycle plant of the present invention, the standby load is a function including a low temperature region and a high temperature region with respect to the metal temperature, and a changing rate of the standby load with respect to the metal temperature in the low temperature region and that in the high temperature region are varied from each other.

Accordingly, the changing rate of the standby load in the low temperature region and the changing rate of the standby load in the high temperature region become different from each other. Therefore, it is possible to carry out the design suitable for the performance of the plant.

In the combined cycle plant of the present invention, the changing rate of the standby load in the high temperature region is set to be greater than the changing rate of the standby load in the low temperature region.

Accordingly, since the changing rate of the standby load in the high temperature region is greater than the changing rate of the standby load in the low temperature region, the standby load varies significantly with respect to a change in metal temperature of the steam turbine in the high temperature region. Therefore, it is possible to further reduce the load zone through which the loads on the gas turbine and the steam turbine are simultaneously increased.

In the combined cycle plant of the present invention, the standby load is set to a constant value in a region in which the metal temperature is equal to or lower than a lower limit temperature set in advance.

Accordingly, since the standby load is set to a constant value in the region in which the metal temperature is equal to or lower than the lower limit temperature, it is possible to simplify control over starting up the gas turbine.

In the combined cycle plant of the present invention, the standby load is set to a constant value in a region in which the metal temperature is equal to or higher than an upper limit temperature set in advance.

Accordingly, since the standby load is set to a constant value in the region in which the metal temperature is equal to or higher than the upper limit temperature, it is possible to suppress generation of thermal stress in the gas turbine.

In addition, according to the present invention, there is provided a combined cycle plant including: a gas turbine that has a compressor, a combustor, and a turbine; a heat recovery steam generator that generates steam by means of exhaust heat of exhaust gas from the gas turbine; a steam turbine that is driven by means of steam generated by the heat recovery steam generator; and a control device configured to set an increasing load rate of the steam turbine during a start-up continuously to change in accordance with a change in metal temperature of the steam turbine.

Accordingly, the increasing load rate of the steam turbine during a start-up is set to an optimum value with respect to the metal temperature of the steam turbine. Therefore, after the steam turbine starts power generation, the power generating amount of the steam turbine can be increased in an early stage, and the time for starting up the combined cycle plant can be shortened.

In the combined cycle plant of the present invention, the increasing load rate is a function of the metal temperature and increases in accordance with a rise of the metal temperature.

Accordingly, since the increasing load rate is a function increasing in accordance with a rise of the metal temperature, when the temperature of the steam turbine rises, the increasing load rate of the steam turbine increases. Therefore, it is possible to increase the power generating amount of the steam turbine in an early stage.

In the combined cycle plant of the present invention, the increasing load rate is a function including a low temperature region and a high temperature region with respect to the metal temperature, and a changing rate of the increasing load rate with respect to the metal temperature in the low temperature region and that in the high temperature region are varied from each other.

Accordingly, the changing rate of the increasing load rate in the low temperature region and the changing rate of the increasing load rate in the high temperature region become different from each other. Therefore, it is possible to carry out the design suitable for the performance of the plant.

In the combined cycle plant of the present invention, the changing rate of the increasing load rate in the high temperature region is set to be greater than the changing rate of the increasing load rate in the low temperature region.

Accordingly, since the changing rate of the increasing load rate in the high temperature region is greater than the changing rate of the increasing load rate in the low temperature region, the increasing load rate varies significantly with respect to a change in metal temperature of the steam turbine in the high temperature region. Therefore, it is possible to increase the power generating amount of the steam turbine in an early stage.

In the combined cycle plant of the present invention, the increasing load rate is set to a constant value in a region in which the metal temperature is equal to or lower than a lower limit temperature set in advance.

Accordingly, since the increasing load rate is set to a constant value in the region in which the metal temperature is equal to or lower than the lower limit temperature, it is possible to simplify control over the operation of the combined cycle plant.

In the combined cycle plant of the present invention, the increasing load rate is set to a constant value in a region in which the metal temperature is equal to or higher than an upper limit temperature set in advance.

Accordingly, since the increasing load rate is set to a constant value in the region in which the metal temperature is equal to or higher than the upper limit temperature, it is possible to suppress generation of thermal stress in the steam turbine caused due to a temperature difference between the steam temperature and the metal temperature.

In addition, according to the present invention, there is provided a device for controlling a combined cycle plant. The combined cycle plant includes a gas turbine, a heat recovery steam generator, and a steam turbine. The device is configured to set a standby load for the gas turbine during a start-up continuously to change in accordance with a change in metal temperature of the steam turbine.

Accordingly, the standby load for the gas turbine during a start-up is set to an optimum value with respect to the metal temperature of the steam turbine. Therefore, the time for starting up the combined cycle plant can be shortened.

According to the present invention, there is provided a device for controlling a combined cycle plant. The combined cycle plant includes a gas turbine, a heat recovery steam generator, and a steam turbine. The device is configured to set an increasing load rate of the steam turbine during a start-up continuously to change in accordance with a change in metal temperature of the steam turbine.

Accordingly, the increasing load rate of the steam turbine during a start-up is set to an optimum value with respect to the metal temperature of the steam turbine. Therefore, the time for starting up the combined cycle plant can be shortened.

In addition, according to the present invention, there is provided a method for starting up a combined cycle plant including a gas turbine, a heat recovery steam generator, and a steam turbine. The method includes setting during a start-up a standby load for the gas turbine continuously to change in accordance with a change in metal temperature of the steam turbine.

Accordingly, the standby load for the gas turbine during a start-up is set to an optimum value with respect to the metal temperature of the steam turbine, so that the gas turbine is operated under a proper load. Therefore, a load zone through which the loads on the gas turbine and the steam turbine are simultaneously increased can be reduced as much as possible, and the time for starting up the combined cycle plant can be shortened.

According to the present invention, there is provided a method for starting up a combined cycle plant including a gas turbine, a heat recovery steam generator, and a steam turbine. The method includes setting during a start-up an increasing load rate of the steam turbine continuously to change in accordance with a change in metal temperature of the steam turbine.

Accordingly, the increasing load rate of the steam turbine during a start-up is set to an optimum value with respect to the metal temperature of the steam turbine. Therefore, after the steam turbine starts power generation, the power generating amount of the steam turbine can be increased in an early stage, and the time for starting up the combined cycle plant can be shortened.

Advantageous Effects of Invention

According to the combined cycle plant, the device for controlling a combined cycle plant, and the method for starting up a combined cycle plant of the present invention, the time for starting up the combined cycle plant can be shortened.

DESCRIPTION OF EMBODIMENT

Hereinafter, with reference to the accompanying drawings, a preferable embodiment of a combined cycle plant, a device for controlling a combined cycle plant, and a method for starting up a combined cycle plant according to the present invention will be described in detail. The present invention is not limited to the embodiment. In addition, in a case of a plurality of embodiments, the embodiments are configured to be combined together.

Figure 1:
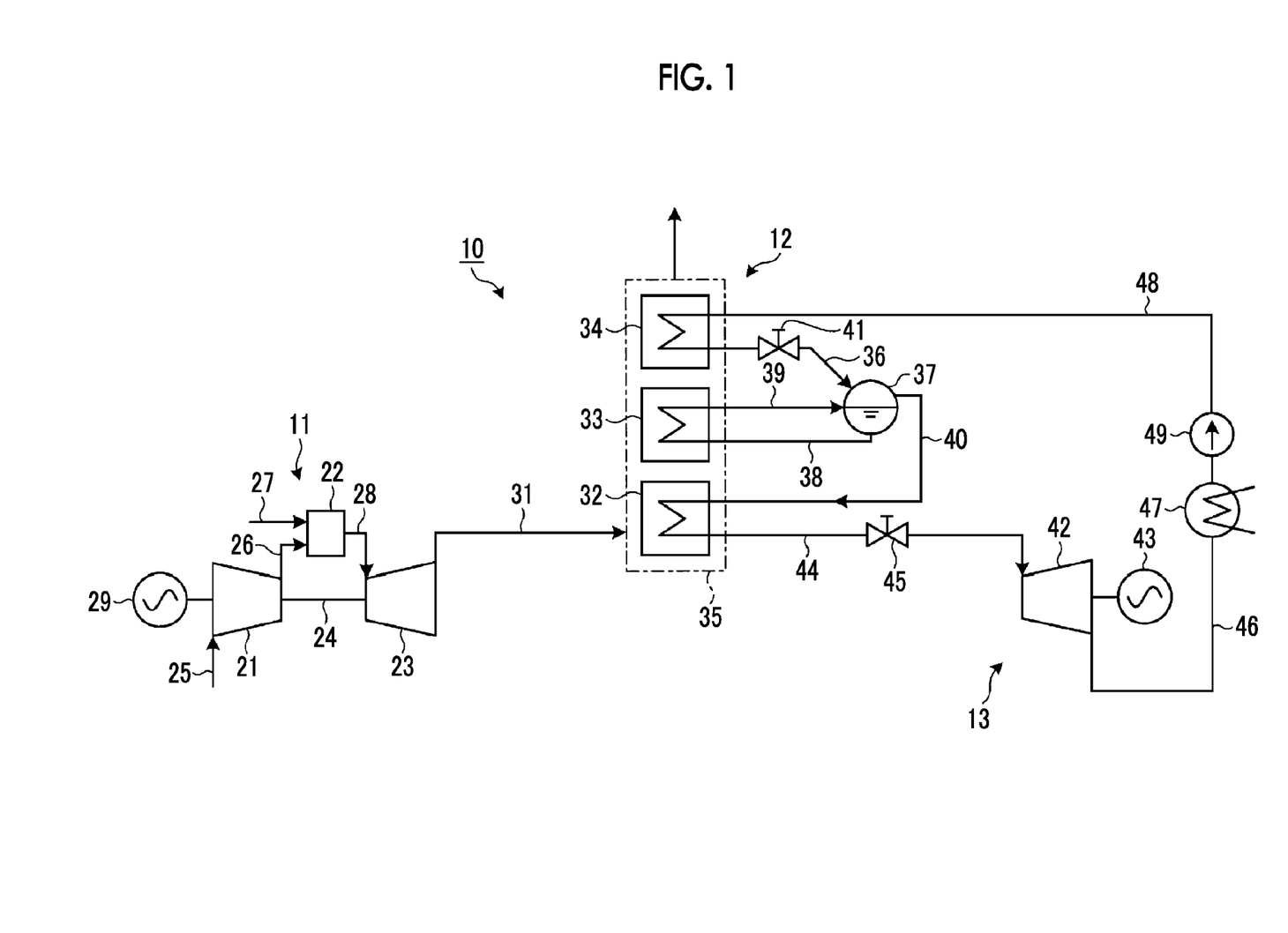
FIG. 1 is a view illustrating a schematic configuration of a combined cycle plant of the present embodiment.

FIG. 1 is a view illustrating a schematic configuration of a combined cycle plant of the present embodiment. In the present embodiment, as illustrated in FIG. 1, a combined cycle plant 10 is provided with a gas turbine 11, a heat recovery steam generator (HRSG) 12, and a steam turbine 13.

The gas turbine 11 includes a compressor 21, a combustor 22, and a turbine 23. The compressor 21 and the turbine 23 are coupled to each other through a rotary shaft (rotor) 24 so as to be integrally rotatable. The compressor 21 compresses air taken in through an air intake line 25. In the combustor 22, compressed air supplied from the compressor 21 through a compressed air supply line 26 and fuel gas supplied through a fuel gas supply line 27 are mixed and combust. The turbine 23 is driven to rotate by means of combustion gas supplied from the combustor 22 through a combustion gas supply line 28. A generator 29 is provided so as to be coaxial with the compressor 21 and the turbine 23. When the turbine 23 rotates, power generation can be carried out.

The heat recovery steam generator 12 generates steam by means of exhaust heat of exhaust gas discharged from the gas turbine 11 (turbine 23) via an exhaust gas discharge line 31. The heat recovery steam generator 12 includes a superheater 32, an evaporator 33, and an economizer 34. Exhaust gas from the gas turbine 11 introduced from a lower portion of a furnace 35 moves upward inside the heat recovery steam generator 12, and heat recovery is performed in the order of the superheater 32, the evaporator 33, and the economizer 34, thereby generating steam.

Therefore, supply water heated by the economizer 34 is sent to a steam drum 37 through a supply water line 36, and the supply water inside the steam drum 37 is heated while circulating between the steam drum 37 and the evaporator 33 via a drum water falling line 38 and a drum water rising line 39, thereby generating steam. Steam generated in the steam drum 37 is sent to the superheater 32 via a saturated steam line 40, and is superheated by the superheater 32. The supply water line 36 is provided with a flow regulation valve 41.

The steam turbine 13 is driven by means of steam generated by the heat recovery steam generator 12 and has a turbine 42. A generator 43 is coaxially coupled to the turbine 42. Steam generated by the superheater 32 is supplied to the turbine 42 via a steam supply line 44. When the turbine 42 rotates, the generator 43 can carry out power generation. The steam supply line 44 is provided with a flow regulation valve 45.

Steam discharged from the turbine 42 is supplied to a condenser 47 via a steam discharge line 46. The condenser 47 cools the recovered steam by means of cooling water (sea water) and obtains condensate. The condenser 47 sends the generated condensate to the economizer 34 via a condensate supply line 48. The condensate supply line 48 is provided with a condensate pump 49.

Therefore, when the combined cycle plant 10 is operated, in the gas turbine 11, the compressor 21 compresses air and the combustor 22 causes supplied compressed air and fuel gas to be mixed and to combust. Then, the turbine 23 is driven to rotate by means of combustion gas supplied from the combustor 22, and the generator 29 carries out power generation. In addition, exhaust gas discharged from the gas turbine 11 (turbine 23) is sent to the heat recovery steam generator 12. Supply water heated by the economizer 34 is sent to the steam drum 37 and is heated while circulating between the steam drum 37 and the evaporator 33, thereby generating steam. Steam generated in the steam drum 37 is sent to the superheater 32 and is superheated. The superheated steam is sent to the steam turbine 13. The turbine 42 is driven to rotate by means of the superheated steam, and the generator 43 carries out power generation. The steam used in the turbine 42 is cooled by means of the cooling water and becomes condensate, and is returned to the economizer 34 by the condensate pump 49.

Incidentally, in the combined cycle plant 10 having such a configuration, a standby load for the gas turbine 11 at the time when being started up is set in accordance with the metal temperature of the steam turbine 13. When the gas turbine 11 is started up, the heat recovery steam generator 12 generates steam by means of exhaust gas from the gas turbine 11, and the steam is supplied to the steam turbine 13 such that the steam turbine 13 is driven to rotate, if there is a significant temperature difference between the temperature of the steam and the metal temperature of the steam turbine 13, a difference in thermal expansion is caused among the constituent members of the steam turbine 13, so that thermal stress acts. Therefore, when the combined cycle plant 10 is started up, if the metal temperature of the steam turbine 13 is low, the standby load for the gas turbine 11 is set to be low, and if the metal temperature of the steam turbine 13 is high, the standby load for the gas turbine 11 is set to be high.

That is, when the combined cycle plant 10 is started up, since the standby load for the gas turbine 11 is set in accordance with the metal temperature of the steam turbine 13, after the gas turbine 11 is started up, this standby load is retained. Then, the heat recovery steam generator 12 generates steam by means of exhaust heat of exhaust gas from the gas turbine 11. When the degree of superheat of the steam generated by the heat recovery steam generator 12 becomes higher than a reference value for the degree of superheat set in advance, and when the temperature difference between the temperature of the steam and the metal temperature of the steam turbine 13 becomes smaller than a reference value for the temperature difference, the flow regulation valve 45 is opened, and the steam generated by the heat recovery steam generator 12 is supplied to the steam turbine 13, thereby starting the operation. Thereafter, the opening degree of the flow regulation valve 45 is controlled and the load on the gas turbine 11 is increased, so that the load on the steam turbine 13 is increased and the power generating amount of the generator 43 is increased.

Figure 2:
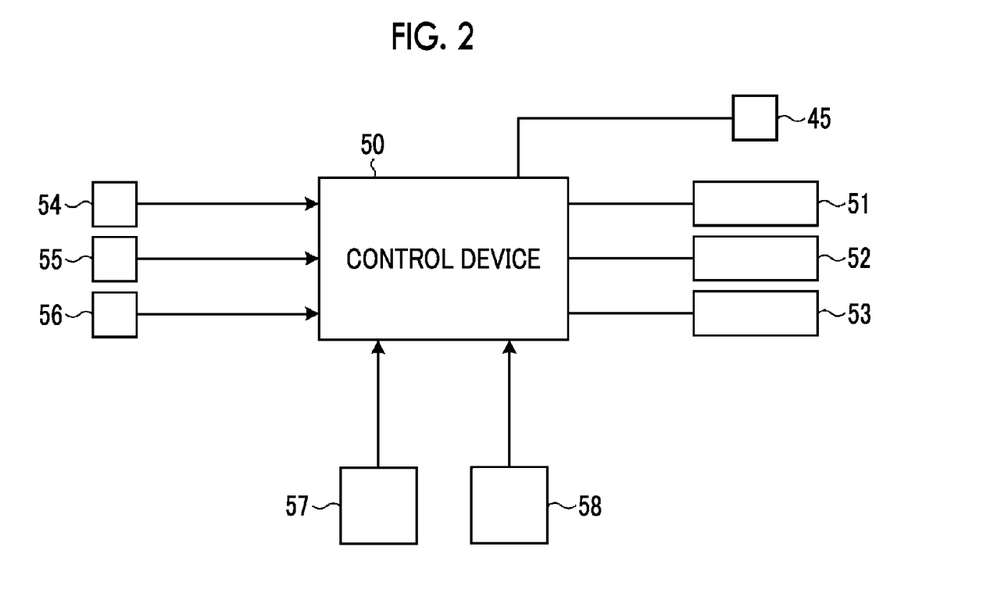
FIG. 2 is a view illustrating a schematic configuration of a device for controlling a combined cycle plant of the present embodiment.

As illustrated in FIG. 2, a gas turbine control unit controlling operation of the gas turbine 11, a steam generator control unit 52 controlling operation of the heat recovery steam generator 12, and a steam turbine control unit 53 controlling operation of the steam turbine are connected to a control device 50, which controls each of the control units 51, 52, and 53. In addition, the control device 50 controls the opening degree of the flow regulation valve 45 which regulates the supply quantity of steam supplied from the heat recovery steam generator 12 to the steam turbine 13. Moreover, there are provided a temperature measuring unit 54 measuring the metal temperature of the steam turbine 13, and a temperature measuring unit 55 and a pressure measuring unit 56 respectively measuring the temperature and the pressure of steam generated by the heat recovery steam generator 12. The metal temperature measured by the temperature measuring unit 54, the steam temperature measured by the temperature measuring unit 55, and the steam pressure measured by the pressure measuring unit 56 are input to the control device 50.

The temperature measuring unit 54 measures the temperature of a rotor in the steam turbine 13. For example, the temperature of a vane in the steam turbine 13 is measured using a thermocouple, and the temperature is adopted as the metal temperature of the steam turbine 13. In this case, the correlation between the temperature of the rotor and the temperature of the vane in the steam turbine 13 may be measured in advance through an experiment or the like, and a measurement result of the temperature measuring unit 54 may be corrected based on this correlating value. In addition, the temperature of a casing of the steam turbine 13, the temperature of a steam supply pipe line, and the like may be measured using temperature measuring units.

In addition, there are provided a standby load setting unit 57 which sets a standby load for the gas turbine 11 during a start-up in accordance with the metal temperature of the steam turbine 13, and an increasing load rate setting unit 58 which sets an increasing load rate of the steam turbine 13 during a start-up in accordance with the metal temperature of the steam turbine 13. The standby load setting unit 57 and the increasing load rate setting unit 58 are connected to the control device 50.

Then, in the present embodiment, the control device is configured to set the standby load for the gas turbine 11 during a start-up continuously to change in accordance with a change in metal temperature of the steam turbine 13. That is, the standby load setting unit 57 has a map (correlation graph) for setting a standby load for the gas turbine 11 continuously to change in accordance with a change in metal temperature of the steam turbine 13.

Figure 3:
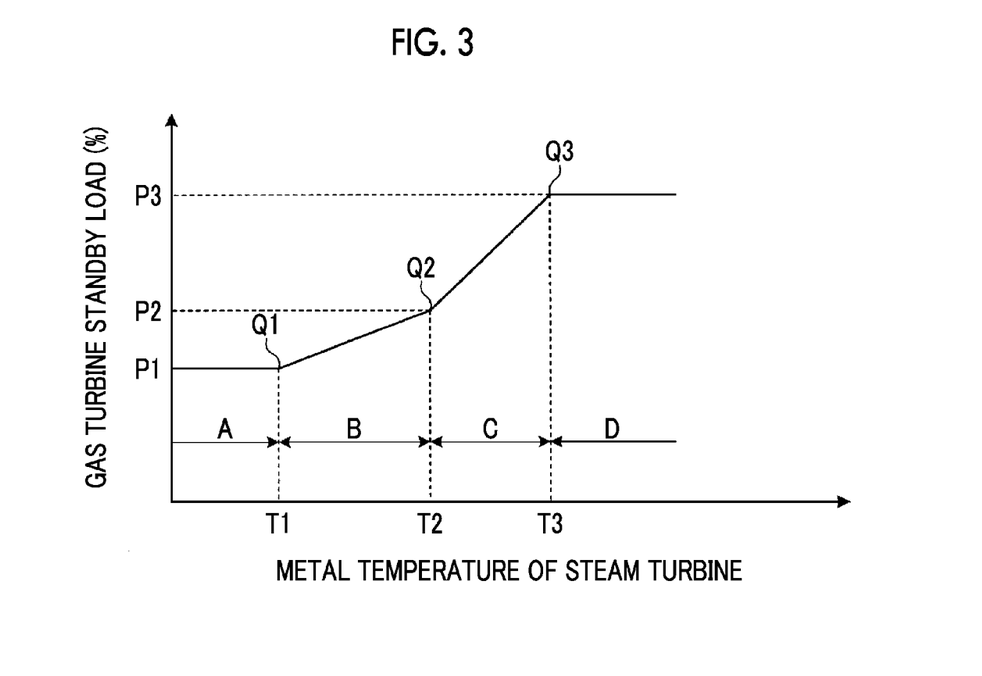
FIG. 3 is a graph illustrating a gas turbine standby load with respect to a metal temperature of a steam turbine.

FIG. 3 is a graph illustrating a gas turbine standby load with respect to a metal temperature of a steam turbine. Here, the standby load for the gas turbine 11 indicates the degree of load retained on the gas turbine 11 during an operation when the heat recovery steam generator 12 generates steam by means of exhaust gas of the gas turbine 11 before steam is supplied to the steam turbine 13 (i.e., when the gas turbine is started up). A gas turbine standby load P is a ratio (%) when the total load is 100(%). As illustrated in FIG. 3, the gas turbine standby load P when the gas turbine 11 is started up is a function of a metal temperature T of the steam turbine 13 and increases in accordance with a rise of the metal temperature T.

In this case, in a region A in which the metal temperature T is equal to or lower than a lower limit temperature T1 (for example, 0° C.) set in advance, the gas turbine standby load P is set to a constant value P1 (for example, 10%). In addition, in a low temperature region B in which the metal temperature T rises from the metal temperature T1 to a metal temperature T2, the gas turbine standby load P is set so as to continuously increase from the gas turbine standby load (constant value) P1 to a gas turbine standby load P2 (for example, 15%). Moreover, in a high temperature region C in which the metal temperature T rises from the metal temperature T2 to a metal temperature T3, the gas turbine standby load P is set so as to continuously increase from the gas turbine standby load P2 to a gas turbine standby load (constant value) P3. Then, in a region D in which the metal temperature T is equal to or higher than the metal temperature T3 which is an upper limit temperature, the gas turbine standby load P is set to the constant value P3 (for example, 30%).

Then, points Q1, Q2, and Q3 are each set between the regions among the regions A, B, C, and D. In the regions B and C, the gas turbine standby load P is a linear function of the metal temperature T, and the point Q2 is set between the low temperature region B of the metal temperatures T1 to T2 and the high temperature region C of the metal temperatures T2 to T3. Then, the changing rate of the gas turbine standby load P in the high temperature region C is set to be greater than the changing rate of the gas turbine standby load P in the low temperature region B.

In addition, the control device 50 is configured to set the increasing load rate of the steam turbine 13 during a start-up continuously to change in accordance with a change in metal temperature of the steam turbine 13. That is, the increasing load rate setting unit 58 has a map (correlation graph) for setting an increasing load rate of the steam turbine 13 continuously to change in accordance with a change in metal temperature of the steam turbine 13.

Figure 4:
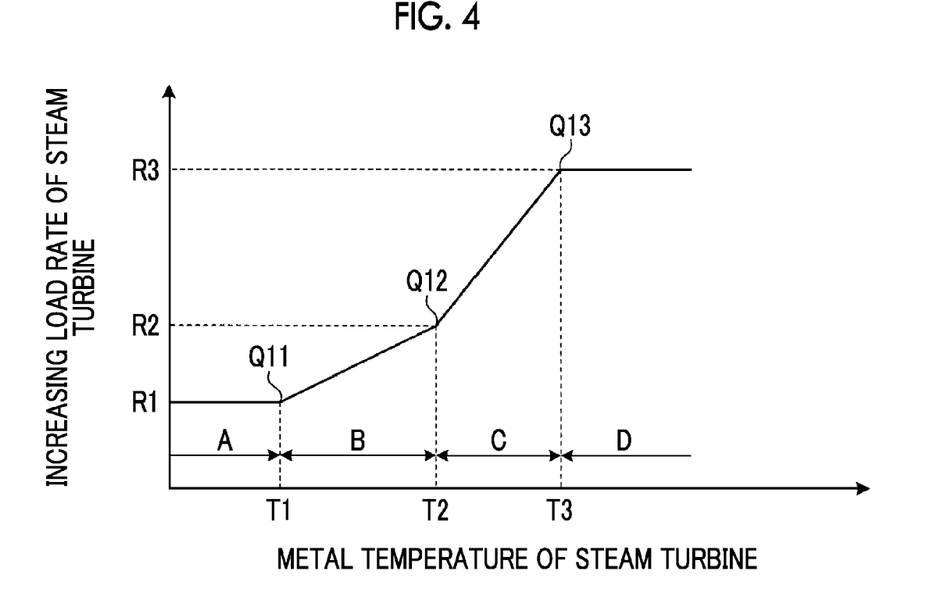
FIG. 4 is a graph illustrating an increasing load rate of the steam turbine with respect to a metal temperature of the steam turbine.

FIG. 4 is a graph illustrating an increasing load rate of the steam turbine with respect to a metal temperature of the steam turbine. Here, the increasing load rate of the steam turbine 13 indicates the degree of speed at which the load on the steam turbine 13 increases when steam is supplied from the heat recovery steam generator 12 to the steam turbine 13. The increasing load rate of the steam turbine 13 is an increasing range of the load on the steam turbine 13 per unit time and has a correlation with an increasing load of combined cycle power generation (power generating amount per unit time). As illustrated in FIG. 4, an increasing load rate R of the steam turbine 13 during a start-up is a function of the metal temperature T of the steam turbine 13 and increases in accordance with a rise of the metal temperature T.

In this case, in the region A in which the metal temperature T is equal to or lower than the lower limit temperature T1 (for example, 0° C.) set in advance, the increasing load rate R is set to a constant value R1. In addition, in the low temperature region B in which the metal temperature T rises from the metal temperature T1 to the metal temperature T2, the increasing load rate R is set so as to continuously increase from the increasing load rate (constant value) R1 to an increasing load rate R2. Moreover, in the high temperature region C in which the metal temperature T rises from the metal temperature T2 to the metal temperature T3, the increasing load rate R is set so as to continuously increase from the increasing load rate R2 to an increasing load rate (constant value) R3. Then, in the region D in which the metal temperature T is equal to or higher than the metal temperature T3 which is the upper limit temperature, the increasing load rate R is set to the constant value R3.

Then, points Q11, Q12, and Q13 are each set between the regions among the regions A, B, C, and D. In the regions B and C, the increasing load rate R is a linear function of the metal temperature T, and the point Q12 is set between the low temperature region B of the metal temperatures T1 to T2 and the high temperature region C of the metal temperatures T2 to T3. Then, the changing rate of the increasing load rate R in the high temperature region C is set to be greater than the changing rate of the increasing load rate R in the low temperature region B.

Hereinafter, a method for starting up a combined cycle plant 10 of the present embodiment will be described. The method for starting up a combined cycle plant 10 of the present embodiment includes setting during a start-up a standby load for the gas turbine 11 continuously to change in accordance with a change in metal temperature of the steam turbine 13. In addition, the method for starting up a combined cycle plant 10 of the present embodiment includes setting an increasing load rate of the steam turbine 13 continuously to change in accordance with a change in metal temperature of the steam turbine 13.

Figure 5:
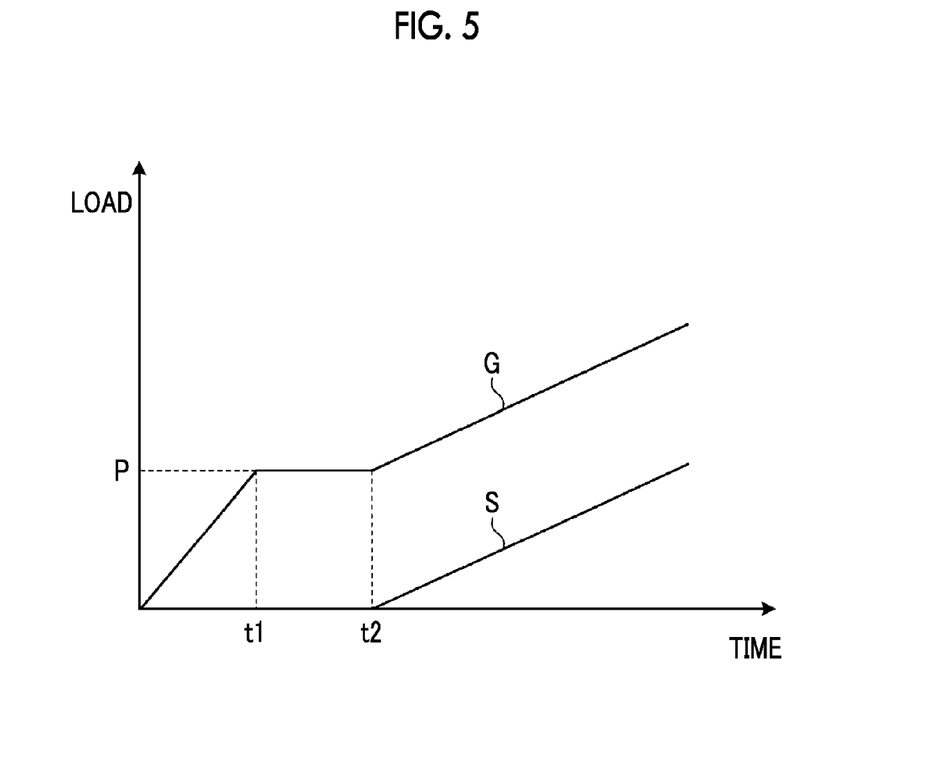
FIG. 5 is a graph illustrating a start-up state of the combined cycle plant.

FIG. 5 is a graph illustrating a start-up state of the combined cycle plant. As illustrated in FIGS. 2 and 5, when the combined cycle plant 10 is started up, the standby load for the gas turbine 11 is set in accordance with the metal temperature of the steam turbine 13. That is, when the metal temperature of the steam turbine 13 is input from the temperature measuring unit 54, the control device 50 causes the standby load setting unit 57 to set the gas turbine standby load corresponding to the metal temperature and causes the gas turbine control unit 51 to start up the gas turbine 11. Then, with the lapse of time, a load G on the gas turbine 11 increases, and the load G reaches the gas turbine standby load P at a time t1. The gas turbine 11 is operated such that the load G is retained to be the gas turbine standby load P. The gas turbine control unit 51 controls the load on the gas turbine 11, for example, based on the supply quantity of fuel gas.

Then, the heat recovery steam generator 12 generates steam by means of exhaust heat of exhaust gas from the gas turbine 11. In this case, the control device 50 calculates the degree of superheat of the steam generated by the heat recovery steam generator 12 based on the pressure of the temperature of the steam input from the temperature measuring unit 55 and the pressure measuring unit 56. The control device 50 determines whether the calculated degree of superheat is higher than the reference value for the degree of superheat. In addition, the control device 50 estimates the steam temperature in an inlet of the steam turbine based on the temperature and the pressure of the steam generated by the heat recovery steam generator 12, input from the temperature measuring unit 55 and the pressure measuring unit 56. The control device 50 determines whether the temperature difference between the estimated steam temperature and the metal temperature of the steam turbine 13 is smaller than the reference value for the temperature difference.

Then, at a time t2, when the degree of superheat of the steam generated by the heat recovery steam generator 12 becomes higher than the reference value for the degree of superheat, and when the temperature difference between the temperature of the steam in the inlet of the steam turbine and the metal temperature of the steam turbine 13 becomes smaller than the reference value for the temperature difference, the flow regulation valve 45 is opened and the steam generated by the heat recovery steam generator 12 is supplied to the steam turbine 13. Then, the steam turbine 13 starts an operation by means of the steam from the heat recovery steam generator 12. In this case, the control device 50 causes the increasing load rate setting unit 58 to set the increasing load rate of the steam turbine 13 corresponding to the metal temperature and causes the steam turbine control unit 53 to operate the steam turbine 13. Then, with the lapse of time, a load S on the steam turbine 13 increases, and the power generating amount of the generator 43 increases. The steam turbine control unit 53 controls the load on the steam turbine 13, for example, based on control over the opening degree of the flow regulation valve 45, and the supply quantity of fuel gas in the gas turbine 11.

As described above, the combined cycle plant of the present embodiment is provided with: the gas turbine 11 that has the compressor 21, the combustor 22, and the turbine 23; the heat recovery steam generator 12 that generates steam by means of exhaust heat of exhaust gas from the gas turbine 11; the steam turbine 13 that is driven by means of steam generated by the heat recovery steam generator 12; and the control device 50 configured to set the standby load for the gas turbine 11 during a start-up continuously to change in accordance with a change in metal temperature of the steam turbine 13.

Accordingly, the standby load for the gas turbine 11 during a start-up is set to an optimum value with respect to the metal temperature of the steam turbine 13, so that the gas turbine 11 is operated under a proper load. Therefore, a load zone through which the loads on the gas turbine 11 and the steam turbine 13 are simultaneously increased can be reduced as much as possible, and the time for starting up the combined cycle plant 10 can be shortened.

In the combined cycle plant of the present embodiment, the gas turbine standby load is a function of the metal temperature, and is set so as to increase in accordance with a rise of the metal temperature. Accordingly, when the temperature of the steam turbine 13 rises, the standby load for the gas turbine 11 increases. Therefore, it is possible to start up the gas turbine 11 under a proper load and to reduce the load zone through which the loads on the gas turbine 11 and the steam turbine 13 are simultaneously increased.

In the combined cycle plant of the present embodiment, the gas turbine standby load is a function including the low temperature region and the high temperature region with respect to the metal temperature, and the changing rate of the standby load with respect to the metal temperature in the low temperature region and that in the high temperature region are varied from each other. Accordingly, the changing rate of the gas turbine standby load in the low temperature region and the changing rate of the gas turbine standby load in the high temperature region become different from each other. Therefore, it is possible to carry out the design suitable for the performance of the plant.

In the combined cycle plant of the present embodiment, the changing rate of the gas turbine standby load in the high temperature region is set to be greater than the changing rate of the gas turbine standby load in the low temperature region. Accordingly, the gas turbine standby load varies significantly with respect to a change in metal temperature of the steam turbine 13 in the high temperature region. Therefore, it is possible to further reduce the load zone through which the loads on the gas turbine 11 and the steam turbine 13 are simultaneously increased.

In the combined cycle plant of the present embodiment, the gas turbine standby load is set to a constant value in a region in which the metal temperature is equal to or lower than the lower limit temperature set in advance. Accordingly, it is possible to simplify control over starting up the gas turbine 11.

In the combined cycle plant of the present embodiment, the standby load for the gas turbine 11 is set to a constant value in a region in which the metal temperature is equal to or higher than the upper limit temperature set in advance. It is possible to suppress generation of thermal stress in the gas turbine 11.

In addition, in the combined cycle plant of the present embodiment, the control device 50 is configured to set the increasing load rate of the steam turbine 13 during a start-up continuously to change in accordance with a change in metal temperature of the steam turbine 13. Accordingly, the increasing load rate of the steam turbine during a start-up is set to an optimum value with respect to the metal temperature of the steam turbine 13. Therefore, after the steam turbine 13 starts power generation, the power generating amount of the steam turbine 13 can be increased in an early stage, and the time for starting up the combined cycle plant 10 can be shortened.

In the combined cycle plant of the present embodiment, the increasing load rate of the steam turbine 13 is a function of the metal temperature and increases in accordance with a rise of the metal temperature. Accordingly, when the temperature of the steam turbine 13 rises, the increasing load rate of the steam turbine 13 increases. Therefore, it is possible to increase the power generating amount of the steam turbine 13 in an early stage.

In the combined cycle plant of the present embodiment, the increasing load rate is a function including the low temperature region and the high temperature region with respect to the metal temperature, and the changing rate of the increasing load rate with respect to the metal temperature in the low temperature region and that in the high temperature region are varied from each other. Accordingly, the changing rate of the increasing load rate in the low temperature region and the changing rate of the increasing load rate in the high temperature region become different from each other. Therefore, it is possible to carry out the design suitable for the performance of the plant.

In the combined cycle plant of the present embodiment, the changing rate of the increasing load rate in the high temperature region is set to be greater than the changing rate of the increasing load rate in the low temperature region. Accordingly, the increasing load rate varies significantly with respect to a change in metal temperature of the steam turbine 13 in the high temperature region. Therefore, it is possible to increase the power generating amount of the steam turbine 13 in an early stage.

In the combined cycle plant of the present embodiment, the increasing load rate is set to a constant value in a region in which the metal temperature is equal to or lower than the lower limit temperature set in advance. Accordingly, it is possible to simplify control over the operation of the combined cycle plant 10.

In the combined cycle plant of the present embodiment, the increasing load rate is set to a constant value in a region in which the metal temperature is equal to or higher than the upper limit temperature set in advance. Accordingly, it is possible to suppress generation of thermal stress in the steam turbine 13 caused due to a temperature difference between the steam temperature and the metal temperature.

In addition, the device for controlling a combined cycle plant of the present embodiment is configured to set the standby load for the gas turbine 11 during a start-up continuously to change in accordance with a change in metal temperature of the steam turbine 13. Accordingly, the standby load for the gas turbine 11 during a start-up is set to an optimum value with respect to the metal temperature of the steam turbine. Therefore, the time for starting up the combined cycle plant 10 can be shortened.

In addition, the device for controlling a combined cycle plant of the present embodiment is configured to set the increasing load rate of the steam turbine 13 during a start-up continuously to change in accordance with a change in metal temperature of the steam turbine 13. Accordingly, the increasing load rate of the steam turbine during a start-up is set to an optimum value with respect to the metal temperature of the steam turbine 13. Therefore, the time for starting up the combined cycle plant 10 can be shortened.

In addition, the method for starting up a combined cycle plant of the present embodiment includes setting during a start-up a standby load for the gas turbine continuously to change in accordance with a change in metal temperature of the steam turbine. In addition, the method includes setting an increasing load rate of the steam turbine 13 continuously to change in accordance with a change in metal temperature of the steam turbine 13. Accordingly, the time for starting up the combined cycle plant 10 can be shortened.

In the embodiment described above, the standby load for the gas turbine 11 and the increasing load rate of the steam turbine 13 are set to be linear functions in each of the regions of the metal temperature of the steam turbine 13. However, the embodiment is not limited to this relationship. That is, the standby load for the gas turbine 11 or the increasing load rate of the steam turbine 13 may be a function equal to or higher than a quadratic function of the metal temperature of the steam turbine 13.

In addition, in the embodiment described above, the standby load for the gas turbine 11 and the increasing load rate of the steam turbine 13 are set to constant values in a region in which the metal temperature T is equal to or lower than the lower limit temperature set in advance. However, the standby load and the increasing load rate may also be set to increase in accordance with a rise of the metal temperature T in this region, too.

In the embodiment described above, one gas turbine 11 and one steam turbine 13 are combined in the combined cycle plant 10. However, the rotary shafts (rotors) thereof may be coaxial with each other or may have axes different from each other. In addition, a plurality of gas turbines 11 and one steam turbine 13 may be combined.

REFERENCE SIGNS LIST

10 COMBINED CYCLE PLANT
11 GAS TURBINE
12 HEAT RECOVERY STEAM GENERATOR
13 STEAM TURBINE
21 COMPRESSOR
22 COMBUSTOR
23 TURBINE
29, 43 GENERATOR
32 SUPERHEATER
33 EVAPORATOR
34 ECONOMIZER
37 STEAM DRUM
42 TURBINE
45 FLOW REGULATION VALVE
47 CONDENSER
49 CONDENSATE PUMP
50 CONTROL DEVICE
51 GAS TURBINE CONTROL UNIT
52 STEAM GENERATOR CONTROL UNIT
53 STEAM TURBINE CONTROL UNIT
54, 55 TEMPERATURE MEASURING UNIT
56 PRESSURE MEASURING UNIT
57 STANDBY LOAD SETTING UNIT
58 INCREASING LOAD RATE SETTING UNIT

The invention claimed is:

1. A device for controlling a combined cycle plant, the combined cycle plant including a gas turbine, a heat recovery steam generator, and a steam turbine, the device comprising:
a controller configured to set a standby load to continuously change in accordance with a change in metal temperature of the steam turbine, the standby load being a load retained on the gas turbine when the gas turbine is started up;
wherein the controller is configured to:
acquire the metal temperature of the steam turbine;
set the standby load based on the metal temperature acquired, and to continuously adjust the standby load in accordance with the change in metal temperature of the steam turbine; and
start up and drive the gas turbine such that a load of the gas turbine reaches the standby load and the load of the gas turbine is retained on the standby load.

2. A combined cycle plant comprising:
a gas turbine including a compressor, a combustor, and a turbine;
a heat recovery steam generator configured to generate steam by exhaust heat of exhaust gas from the gas turbine;
a steam turbine to be driven by means of steam generated by the heat recovery steam generator; and
the device according to claim 1.

3. The combined cycle plant according to claim 2, wherein the standby load is a function of the metal temperature and increases in accordance with a rise of the metal temperature.

4. The combined cycle plant according to claim 3, wherein the standby load is a function including a low temperature region and a high temperature region with respect to the metal temperature, and a changing rate of the standby load with respect to the metal temperature in the low temperature region and that in the high temperature region are varied from each other.

5. The combined cycle plant according to claim 4, wherein the changing rate of the standby load in the high temperature region is set to be greater than the changing rate of the standby load in the low temperature region.

6. The combined cycle plant according to claim 2, wherein the standby load is set to a constant value in a region in which the metal temperature is equal to or lower than a lower limit temperature set in advance.

7. The combined cycle plant according to claim 2, wherein the standby load is set to a constant value in a region in which the metal temperature is equal to or higher than an upper limit temperature set in advance.

8. A combined cycle plant comprising:
a gas turbine including a compressor, a combustor, and a turbine;
a heat recovery steam generator configured to generate steam by exhaust heat of exhaust gas from the gas turbine;
a steam turbine driven by steam generated by the heat recovery steam generator; and
the device according to claim 1.

9. The combined cycle plant according to claim 8, wherein the increasing load rate is a function of the metal temperature and increases in accordance with a rise of the metal temperature.

10. The combined cycle plant according to claim 9, wherein the increasing load rate is a function including a low temperature region and a high temperature region with respect to the metal temperature, and a changing rate of the increasing load rate with respect to the metal temperature in the low temperature region and that in the high temperature region are varied from each other.

11. The combined cycle plant according to claim 10, wherein the changing rate of the increasing load rate in the high temperature region is set to be greater than the changing rate of the increasing load rate in the low temperature region.

12. The combined cycle plant according to claim 8, wherein the increasing load rate is set to a constant value in a region in which the metal temperature is equal to or lower than a lower limit temperature set in advance.

13. The combined cycle plant according to claim 8, wherein the increasing load rate is set to a constant value in a region in which the metal temperature is equal to or higher than an upper limit temperature set in advance.

14. The device according to claim 1, wherein the controller is configured to set an increasing load rate of the steam turbine during a start-up to continuously change in accordance with a change in metal temperature of the steam turbine.

15. A method of starting up a combined cycle plant, the combined cycle plant including a gas turbine, a heat recovery steam generator, and a steam turbine, and said method comprising:

setting during a start-up a standby load to continuously change in accordance with a change in metal temperature of the steam turbine, the standby load being a load retained on the gas turbine when the gas turbine is started up;

wherein said setting the standby load during the start-up comprises:

acquiring the metal temperature of the steam turbine;

setting the standby load based on the metal temperature acquired, and continuously adjusting the standby load in accordance with the change in metal temperature of the steam turbine; and starting up and driving the gas turbine such that a load of the gas turbine reaches the standby load and the load of the gas turbine is retained on the standby load.

16. The method according to claim 15, further comprising setting during a start-up an increasing load rate of the steam turbine to continuously change in accordance with a change in metal temperature of the steam turbine.

* * * * *